United States Patent [19]
Funato et al.

[11] Patent Number: 5,736,082
[45] Date of Patent: Apr. 7, 1998

[54] METHOD FOR PRODUCING A PLASTIC MOLDING WITH A FOAM CORE AND AN OUTER SKIN

[75] Inventors: Toshiyasu Funato; Koichi Abe; Yasushi Yokoi, all of Anjo, Japan

[73] Assignee: Kabushiki Kaisha Inoac Corporation, Nagoya, Japan

[21] Appl. No.: 706,461

[22] Filed: Sep. 4, 1996

Related U.S. Application Data

[62] Division of Ser. No. 337,434, Nov. 8, 1994, abandoned.

[30] Foreign Application Priority Data

| Mar. 11, 1994 | [JP] | Japan | 6-67612 |
| Mar. 25, 1994 | [JP] | Japan | 6-79677 |
| Jul. 1, 1994 | [JP] | Japan | 6-173728 |

[51] Int. Cl.$^6$ .......................... B29C 44/06; B29C 44/14
[52] U.S. Cl. .................. 264/46.5; 264/46.6; 264/273
[58] Field of Search ........................ 264/273, 46.5, 264/46.6

[56] References Cited

U.S. PATENT DOCUMENTS

| 3,379,800 | 4/1968 | Wert . | |
| 3,435,470 | 4/1969 | Krenzler | 156/79 |
| 4,118,451 | 10/1978 | Schaus . | |
| 4,269,890 | 5/1981 | Breitling et al. . | |
| 4,386,982 | 6/1983 | Weinhaus . | |
| 4,409,163 | 10/1983 | Van Manen | 264/273 |
| 4,420,447 | 12/1983 | Nokashima | 264/46.7 |
| 4,542,054 | 9/1985 | Fillmann . | |
| 4,878,827 | 11/1989 | Muller . | |
| 5,193,264 | 3/1993 | Brown | 264/46.6 |
| 5,356,580 | 10/1994 | Clark et al. | 264/51 |
| 5,500,168 | 3/1996 | Suzuki . | |
| 5,500,169 | 3/1996 | Kondo et al. | 264/46.5 |

FOREIGN PATENT DOCUMENTS

| 26 56 965 | 6/1978 | Germany . |
| 34 08 916 | 9/1985 | Germany . |

*Primary Examiner*—Allan R. Kuhns
*Attorney, Agent, or Firm*—Armstrong, Westerman, Hattori, McLeland & Naughton

[57] ABSTRACT

A plastic molding has a core and a skin-provided foam provided on an outer surface of the core. The core is provided with side walls, a foaming material receiving portion defined by the side walls, and through holes provided in the bottom surface of the foaming material receiving portion to extend through the core to connect the foaming material receiving portion to the outside of the core. The skin-provided foam includes a foam which is received in the foaming material receiving portion of the core to be adhered to the bottom surface thereof and enters the through holes of the core to constitute engaging portions with the core, and a skin member which covers the outer surface and side surfaces of the foam and is held at the end portions thereof between the foam and the side walls of the core. The disclosure is also directed to a method for producing such a plastic molding.

8 Claims, 14 Drawing Sheets

5,736,082

METHOD FOR PRODUCING A PLASTIC MOLDING WITH A FOAM CORE AND AN OUTER SKIN

This a divisional of application Ser. No. 08/337,434 filed Nov. 8, 1994, now abandoned.

BACKGROUND OF THE INVENTION

1. Field of the Invention

The present invention relates to a plastic molding including a core which is provided on an outer surface thereof with a foam with an outer skin, and a method for producing the same.

2. Description of the Related Art

For instance, a conventional instrument panel fop an automobile is usually made of a core 81 (base or substrate) which is provided, on a part or entirety (not shown) of the outer surface thereof, with a pad comprising a foam 83 with an outer skin, depending on a design, as shown in FIG. 18. FIG. 19 shows an enlarged sectional view taken along the line A—A in FIG. 18.

In an instrument panel made of a core and a foam with an outer skin, provided on a part of the outer surface of the core, a foam assembly 83 comprising a mounting base 84, a foam 86 and an outer skin member 87 is prepared in advance and is mounted to a core 81 at a predetermined position. To mount the foam assembly 83 to the core 81, mounting pins 85 provided on the base 84 of the foam assembly 83 are inserted and bent in mounting holes 82 formed in the core 81. Clips or screws, etc., can be used in place of the mounting pins 82.

However, since the foam assembly 83 is provided with the base 84 which is usually made of a steel plate, the instrument panel is heavy and expensive.

Moreover, since the foam assembly 83 is mounted to the core 81 in a subsequent stage, a gap or clearance tends to occur at a connecting portion 88 between the foam assembly 83 and the core 81, thus leading to a poor or bad appearance of the plastic molding (product). In particular, in an instrument panel made of a core whose outer surface is partly covered by the foam assembly, since the connecting portion 88 between the core 81 and the foam assembly 83 appears on the outer surface of the plastic molding, the gap or clearance is unacceptable from the aesthetic view point. Furthermore, an additional troublesome process to mount the foam assembly to the core is necessary.

In an instrument panel made of a core whose outer surface is entirely covered by the foam assembly, a skin member which is provided on the peripheral edge thereof with a skirt to prevent the surface of the skin from being stained is used. Namely, the skin member is disposed on a die surface of a lower die of a die assembly which is comprised of the lower die and an upper die, so that the skirt is located on a periphery of a cavity, i.e., a parting of the die assembly defined by the lower and upper dies. The core is disposed on the die surface of the upper die. When the upper and lower dies are closed, the skirt is held between the upper and lower dies. In the closed position, a foaming material is introduced and foamed in the cavity. The skirt is finally cut and removed to produce a plastic molding (product).

However, in the producing method mentioned above, the foaming material tends to flow or leak from the periphery of the cavity during foaming, thus resulting in an occurrence of a flash. Moreover, it is necessary to cut and remove the skirt of the skin member, which is stained with flash, and, troublesome. In addition to the foregoing, the foaming material sticking to the outer surface of the cut skirt makes it difficult to reuse the cut skirt, resulting in a waste of the material.

SUMMARY OF THE INVENTION

It is an object of the present invention to provide a light plastic molding (product) of a good appearance comprised of a core which is provided on a part of the outer surface thereof with a foam with an outer skin or a light plastic molding (product) of a good appearance having no flash, comprised of a core which is provided on an entire outer surface thereof with a foam with an outer skin, wherein there is no waste of the material of which the skin member is made.

Another object of the present invention is to provide a method for producing such a plastic molding (product).

To achieve the object mentioned above, according to a first aspect of the present invention, there is provided a plastic molding having core and a skin-provided foam provided on an outer surface of the core, said core being provided with side walls, a foaming material receiving portion defined by the side walls, and through holes provided in the bottom surface of the foaming material receiving portion to extend through the core to connect the foaming material receiving portion to the outside of the core, said skin-provided foam being comprised of a foam which is received in the foaming material receiving portion of the core to be adhered to the bottom surface thereof and enters the through holes of the core to constitute engaging portions with the core, and a skin member which covers the outer, surface and side surfaces of the foam and is held at the end portions thereof between the foam and the side walls of the core.

According to another aspect of the present invention, there is provided a method for producing a plastic molding having a core and a skin-provided foam provided on an outer surface of the core, comprising the steps of disposing a skin member whose ends are bent backward to form side portions, on a die surface of a lower die; disposing a core which is provided with side walls, a foaming material receiving portion defined by the side walls, and through holes formed in the bottom surface of the core to connect the foaming material receiving portion to the outside of the core, on a die surface of a upper die of a die assembly, so that the skin member is fitted in the foaming material receiving portion of the core; and pouring and foaming a foaming material in a space between the bottom surface of the foaming material receiving portion and the skin member to form a foam integral with the core and the skin member, wherein the foaming material enters the through holes of the core to form an engaging portion between the foam and the core.

A plastic molding (product) obtained by the present invention is light since the skin-provided foam consists of a foam and a skin and has no heavy steel base. Moreover, since the foaming material that enters the through holes of the core serves as a rigid connector of the foam to the core, no separation of the foam from the core or the skin member from the foam occurs.

When the foaming material is foamed, the internal pressure in the space between the bottom surface of the foaming material receiving portion of the core and the skin member is increased owing to continuing reaction of the foaming material. Accordingly, the side walls of the skin member are pressed by the expanded foaming material onto the corresponding side walls of the foaming material receiving portion of the core to establish a fluid-tight seal therebetween. However, since there are through holes of the core provided at the end portions of the foaming material receiving portion of the core and located above the ends of the skin member to connect the foaming material receiving portion to the outside of the core, the internal pressure becomes low due to escape of air and generated gas. Consequently, the foaming material flows toward the end portions of the foaming material receiving portion in which the through holes are provided and enters the through holes while pressing the side walls of the skin member outward. As a result, the side walls of the skin member can be more effectively and reliably sealed.

Note that even if the side walls of the skin member are made of uneven or slightly waved surfaces, the side walls of the skin member are pressed onto the corresponding side walls of the foaming material receiving portion of the core by the foaming pressure, i.e., internal pressure within the closed space between the core and the skin member, which is generated and increased by foaming (continuing reaction) of the foaming material, thus resulting in an establishment of the fluid-tight seal therebetween.

Since the through holes formed in the core that constitutes a back of a plastic molding (product) are adapted to discharge the foaming gas (i.e., pressure) as mentioned above, the foaming material can be easily and positively introduced into the through holes, so that no exit of the foaming material occurs between the side walls of the skin member and the side walls of the foaming material receiving portion of the core, thus resulting in a prevention of the foaming material from leaking out onto the outer surface of the skin member, leading to a bad appearance of the plastic molding (product). Moreover, since the foaming material that has entered the through holes completes its foaming and curing reaction subsequently, the foaming material serves as a rigid connector of the foam to the core. Namely, the skin-provided foam can be firmly secured to the core. Furthermore, since the foaming material is foamed or expanded while pressing the side walls of the skin member against the side walls of the foaming material receiving portion of the core, there is no gap between the core and the skin-provided foam in a plastic molding (product) thus obtained. This improves an aesthetic appearance of the plastic molding (product).

In addition to the foregoing, since the skin member has no skirt to be cut, no additional cutting operation for the skirt is necessary. Consequently, the manufacturing or assembling process can be simplified as a whole.

BRIEF DESCRIPTION OF THE DRAWINGS

The invention will be described below in detail with reference to the accompanying drawings, in which.

DESCRIPTION OF THE PREFERRED EMBODIMENT

Figure 1:
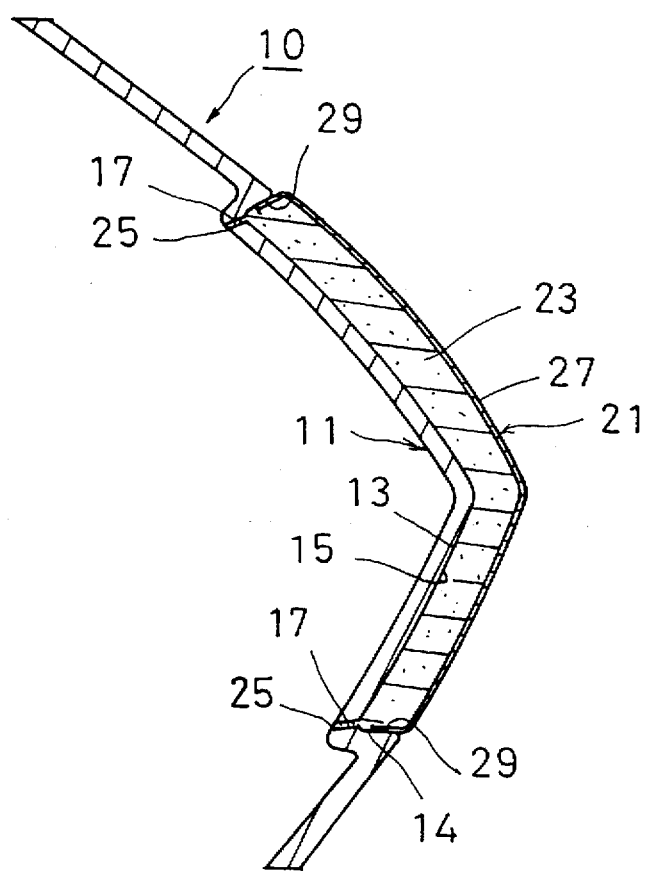
FIG. 1 is a sectional view of a plastic molding (product) having a foam with an outer skin provided on a part of a surface of a core, according to a first embodiment of the present invention.
Figure 2:
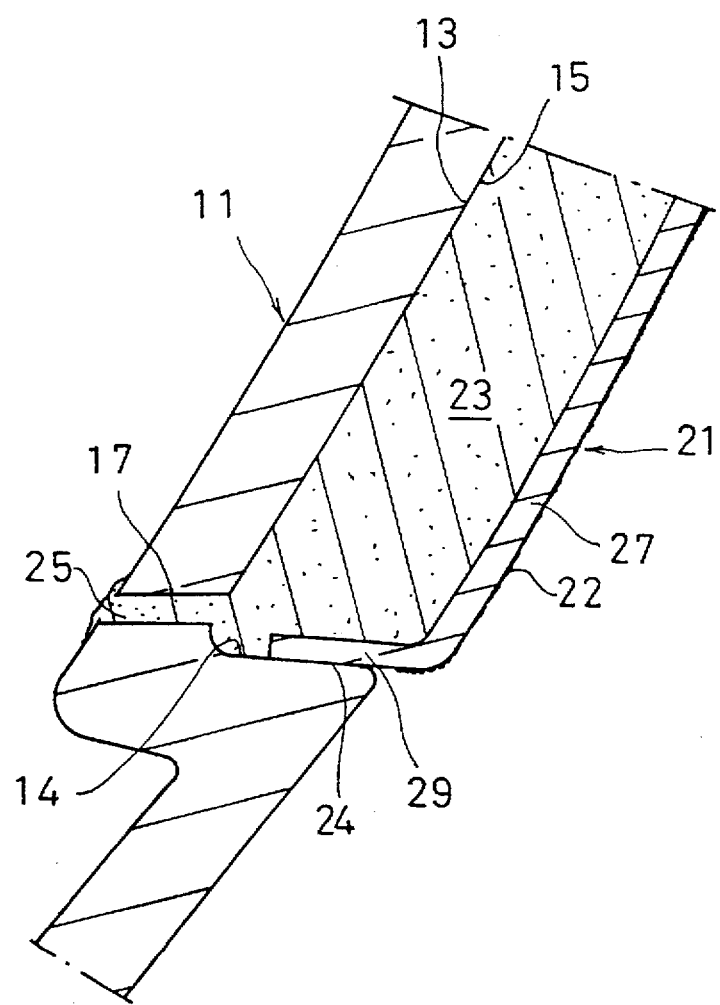
FIG. 2 is an enlarged sectional view of a main part of FIG. 1.
Figure 7:
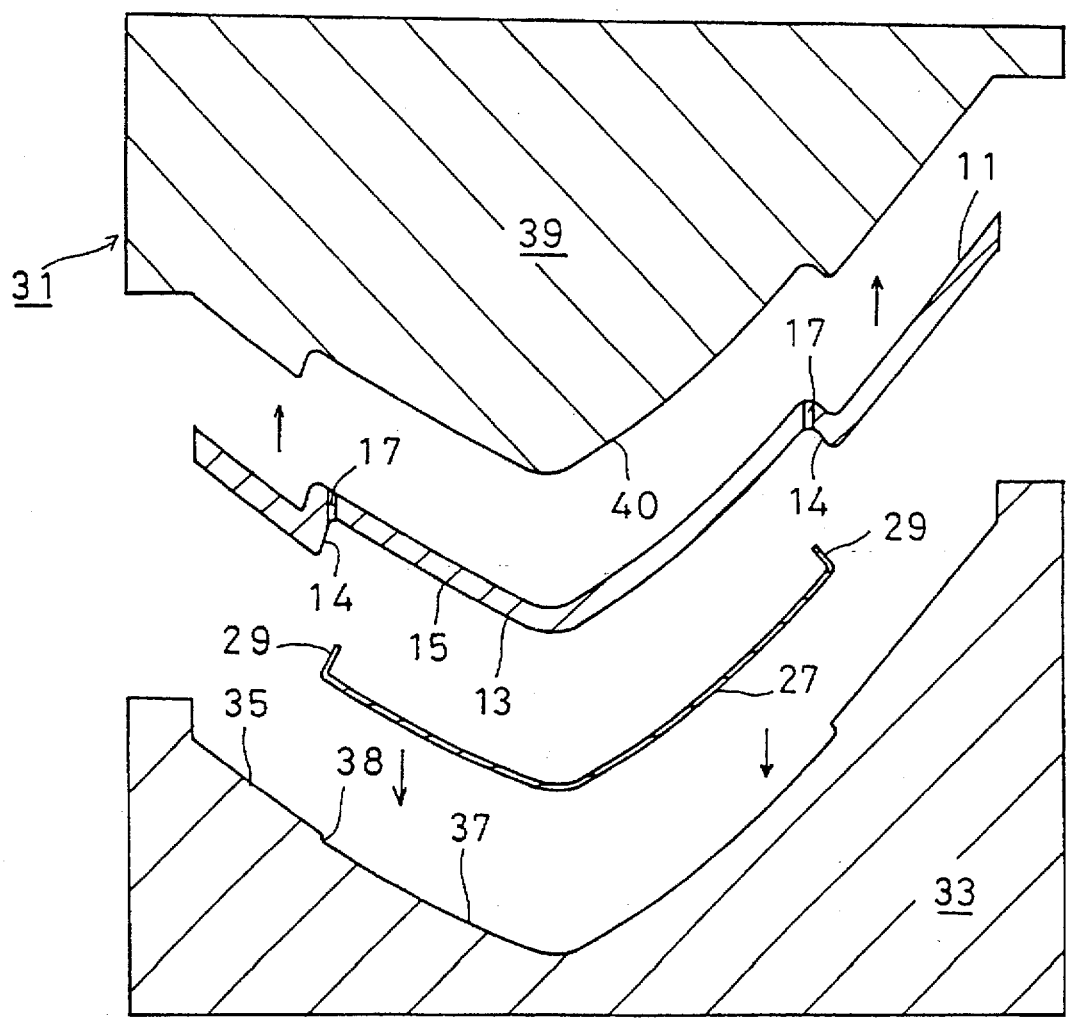
FIG. 7 is a sectional view of a die assembly in which a skin member and a core are arranged, for producing a plastic molding (product) shown in FIG. 1.
Figure 8:
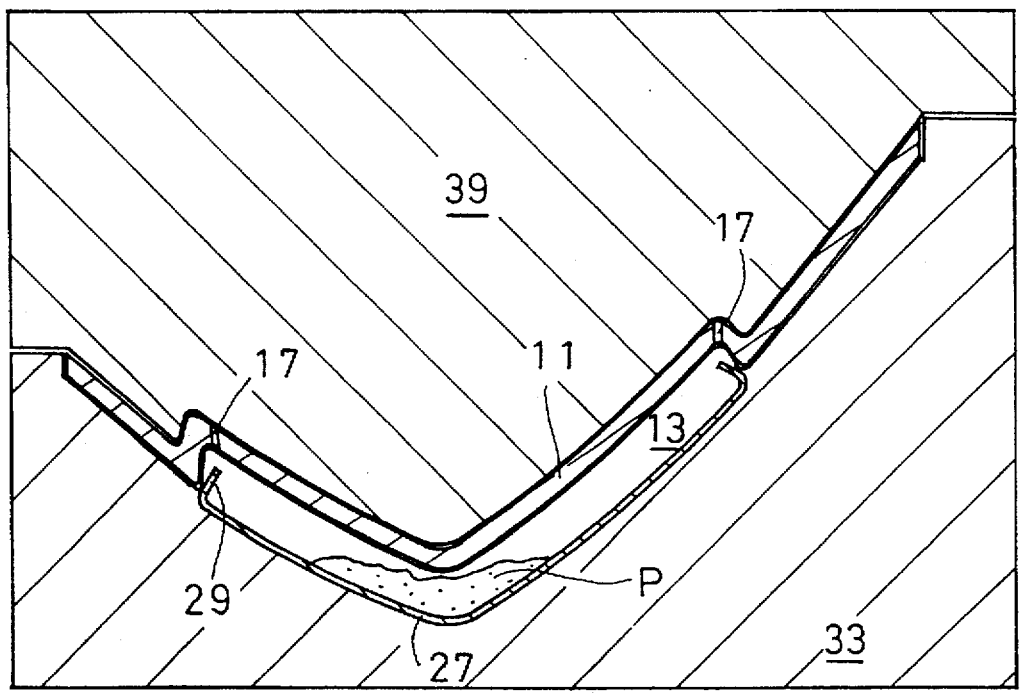
FIG. 8 is a sectional view of a die assembly in which a foaming material is introduced, for producing a plastic molding (product) shown in FIG. 1.

A plastic molding 10 shown in FIGS. 1 and 2 is used for an instrument panel of an automobile and is comprised of a core 11 which is provided on a part of the outer surface thereof with a foam 21 with an outer skin 27. The core 11 and the skin 27 are also shown in FIG. 7 which will be referred to in the following discussion.

Although the following discussion will be addressed to an instrument panel for an automobile, the present invention is not limited thereto. Namely, a plastic molding to be obtained in the present invention and a method for producing the same can be applied to various products.

The core 11 is made of a self-shape maintaining plastic material, such as a rigid plastic material e.g., acrylonitrile-butadiene-styrene (ABS) resin, polypropylene, polyphenylene oxide or fiber-reinforced plastic, etc. The core 11 is provided with side walls 14 which define a foaming material receiving portion 13, so that a foaming material 23 is introduced and received in the foaming material receiving portion 13. The shape and size of the 11 are determined in accordance with a design or purpose of usage thereof, etc. In FIGS. 1 and 2, numeral 15 designates the bottom surface of the foaming material receiving portion The core 11 is provided with through holes 17 extending therethrough to connect the foaming material receiving portion 13 to the outside of the core, at the edges of the bottom surface 15 of the core 11. The through holes 17 can be engaged by engaging projections of the foam 23 which will be discussed hereinafter, to constitute an engaging portion between the core and the foam. Namely, the introduced foaming material flows along the side walls 14 of the core 11 according to expansion and flows out onto the rear side of the core 11 opposite to the bottom surface 15 through the through holes 17 duping foaming. The number, size (diameter) and distance of the through holes 17 are determined in accordance with the compound the foaming material, etc., so that an appropriate quantity of the foaming material 23 can be flown into and discharged from the through holes 17 so as not to produce voids in the foam to be formed. For example, the through holes 17 whose diameter is approximately 1 to 4 mm are spaced at a distance of 50 to 200 min. The distance can be reduced.

The skin-provided foam (foam assembly) 21 is comprised of the foam 23 and the skin member 27 which surrounds the outer surface and the side surfaces of the foam 23. The skin-provided foam 21 is received in the foaming material receiving portion 13 of the core.

The foam 23 whose shape is substantially identical to the shape of the foaming material Receiving portion 13 is provided with the engaging projections 25 which are engaged in the through holes 17 of the core 11. A part off the engaging projections 25 spreads over and is adheres to the rear surface of the core 11. The engaging projections 25 are made of the introduced and foamed material in the cavity defined by and between the bottom surface 15 of the core 11 and the skin member 27 as mentioned above. Upon completion off foaming, the foaming material 23 is adhered to both the bottom surface 15 of the core and the inner surface of the skin member 27 due to the self-adhesiveness thereof. In addition, the foaming material enters the through holes 25 to constitute the engaging projections during foaming, and is adhered to the inner surfaces of the through holes. This ensures that the foam 23 is integrally connected to the core.

The skin member 27 which is turned backward at the opposed ends thereof to form the side walls (side portions) 29 covers the outer surface and side surfaces of the foam 23 and is adhered to the foam 23 due to the self-adhesiveness of the foaming material. The side portions of the skin can be molded at the same when the skin is molded in a predetermined shape. The side walls 29 of the skin member 27 are pressed onto the corresponding side walls 14 of the core 11 by the foaming pressure generated and increased by foaming (continuing reaction) of the foaming material 23 in the space defined between the bottom surface 15 of the cone 11 and the skin member 27. Namely, the side walls 29 of the skin member 27 are firmly held between the expanded foam 23 and the side walls 14 of the skin foaming material receiving portion 13 of the core. Consequently, there is no gap between the foam 23 or the side walls 29 off the skin member 27 and the side walls 14 of the core 11.

The skin member 27 is made of an impermeable material, such as a leather-like plastic sheet or a fabric sheet whose back surface is coated with a plastic on banded with a plastic film, etc. If the skin member 27 is made of a leather-like plastic sheet, a certain kind grain pattern 22 is usually provided on the outer surface of the skin member 27 to exhibit a leather-like finish as if it were an animal skin. In this case, however, it is preferable that the surface portions of the skin member that come into contact with the side walls 14 of the core 11 are smooth surfaces 24 without such a grain pattern, so that a close contact can be established between the smooth surfaces 24 of the skin member 27 and the side walls 14 of the core 11 without a gap therebetween, thus resulting in an improved aesthetic appearance of the plastic molding (product).

The plastic molding (product) 10 thus obtained is light owing to an absence of the heavy base unlike the prior art in which the foam assembly is comprised of a base, a foam and a skin member, as mentioned above.

Figure 3:
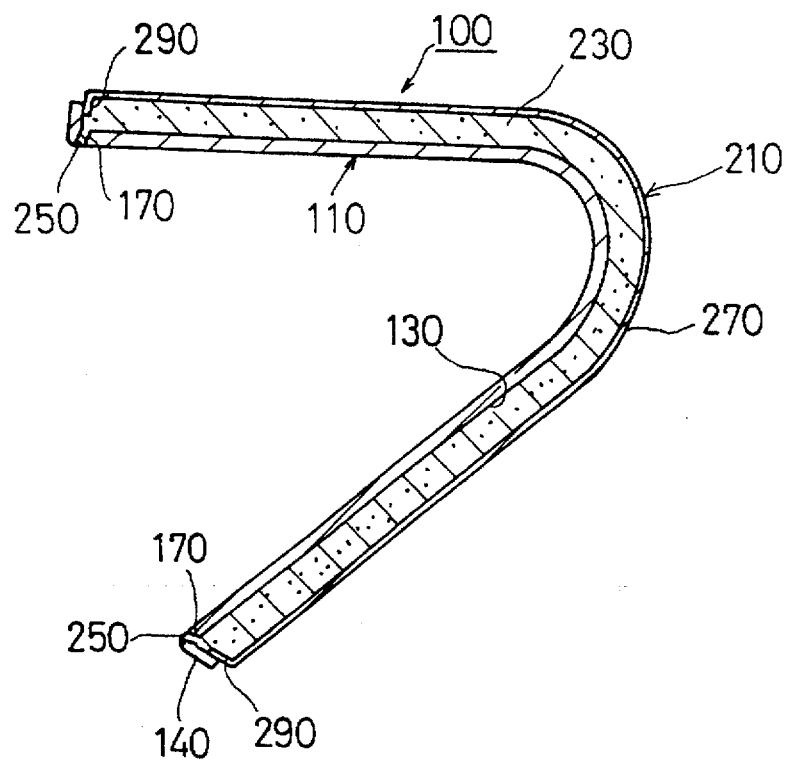
FIG. 3 is a sectional view of a plastic molding (product), according to a second embodiment of the present invention.

FIG. 3 shows another example of a plastic molding (product) 100. The plastic molding (product) 100 which is applied to an instrument panel is comprised of the core 110 whose outer surface is entirely covered by the skin-provided foam 210 (the foam 230 with the skin 270). The core 110 is turned toward the skin member 270 at the opposed ends thereof to form side walls 140 which define the foaming material receiving portion 130. There are through holes 170 that are provided in the core 110 at the edges thereof to extend through the core thereby to connect the foaming material receiving portion 130 to the outside of the core 110. In FIG. 3, numeral 230 designates the foam, 250 the engaging portion, and 290 the side walls of the skin member, respectively.

Figure 4:
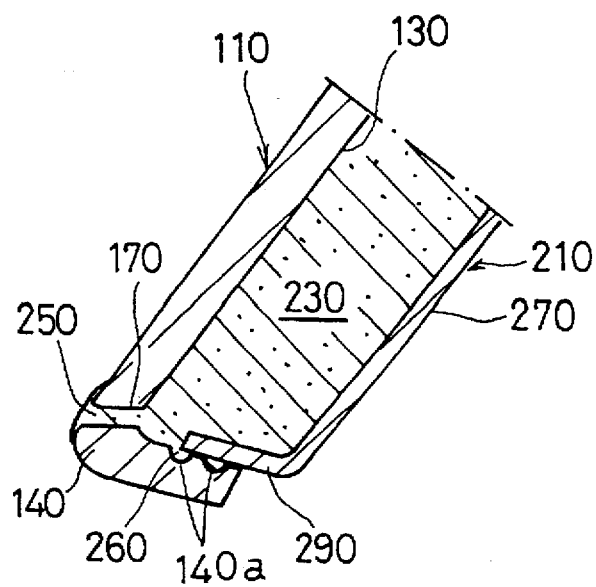
FIG. 4 is an enlarged sectional view of a main part of a plastic molding (product), according to a third embodiment of the present invention.

It is possible to provide recessed grooves 140a on the inner surfaces of the side walls 140 of the core 110 to extend along a part or entirety of the periphery of the foaming material receiving portion 130, as shown in FIG. 4. The recessed grooves 140a ensures that if the foaming material 230 penetrates between the side walls 290 of the skin member and the side walls 140 of the foaming material receiving portion because of incomplete seal therebetween, the penetrated foaming material is received foamed in the recessed grooves 140a to seal the same. Moreover, the foaming material thus foamed in the recessed grooves 140a forms the engaging projections 260 to integrally connect the core and the foam.

Figure 5:
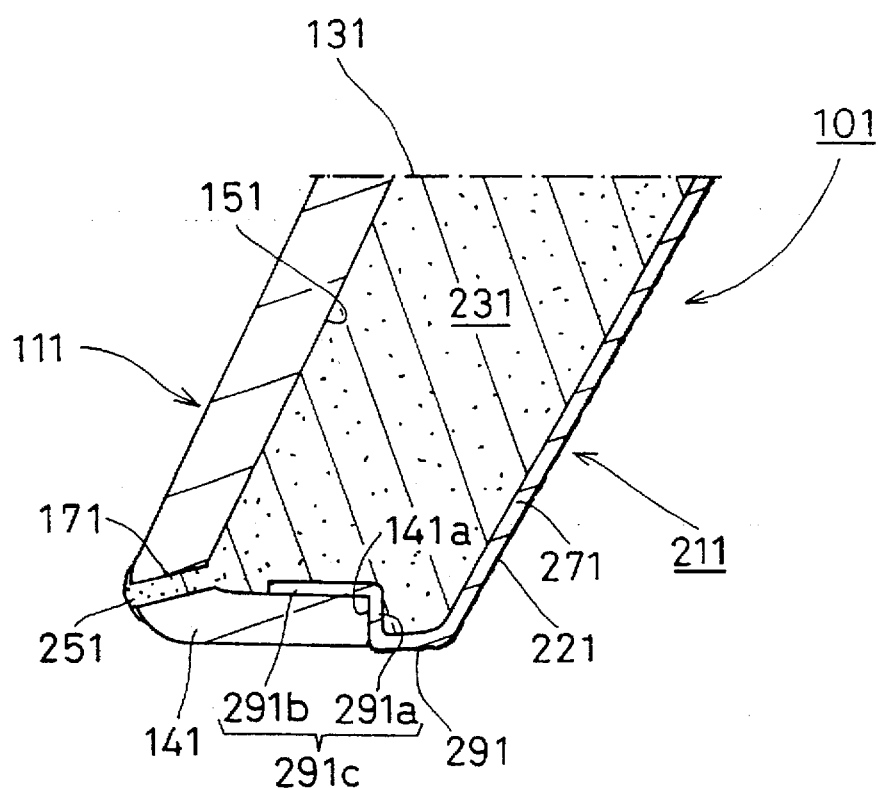
FIG. 5 is an enlarged sectional view of a main part of a plastic molding (product), according to a fourth embodiment of the present invention.
Figure 6:
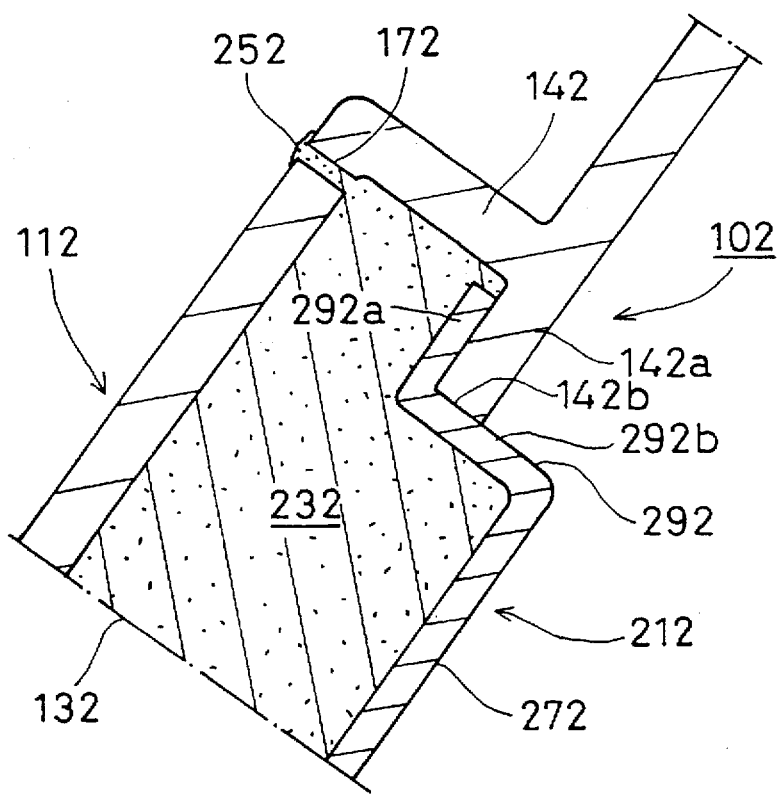
FIG. 6 is an enlarged sectional view of a main part of a plastic molding (product), according to a fifth embodiment of the present invention.

The shape of the side walls 290 of the skin member 270 and the side walls of the foaming material receiving portion of the core can be modified to enhance the seal effect, for example as shown in FIGS. 5 and 6.

FIG. 5 shows an enlarged sectional view of a main part of a modified plastic molding. The plastic molding 101 shown in FIG. 5 is provided with generally b-shaped bent portions 291c in cross section at the side wall 291, each consisting of a sealing flat surface portion 291a that extends inward from the side wall 291 of the skin member 271 and a seal tongue 291b that extends toward the bottom surface 151 of the foaming material receiving portion 131 from the front end of the sealing flat surface portion 291a. The latter abuts against the front end 141a of the side wall 141 of the core 111. The seal tongues 291b are in surface contact with the inner surfaces of the side walls 141 of the core 111. In FIG. 5, numerals 171, 211, 221, 231, and 251 designate the through hole, the skin-provided foam, the grain pattern, the foam, and the engaging portion, respectively.

In a modified example shown in FIG. 6, the plastic molding 102 is provided with outwardly projecting flanges (only one is shown) 292a provided at the front ends of the side walls 292 of the skin member 272, and inwardly projecting flanges (only one is shown) 142a provided at the front ends of the side walls 142 of the foaming material receiving portion 132 of the core 112. The front ends 142b of the inwardly projecting flanges 142 of the core 112 abut against the side surfaces 292b of the associated side walls 292b of the skin member 272. The inner surfaces of the inwardly projecting flanges 142a are brought into close surface contact with the corresponding outer surfaces of the outwardly projecting flanges 292a of the skin member 272. In FIG. 6, numerals 172, 212,232, and 252 designate the through hole, the skin-provided foam, the foam, and the engaging portion, respectively.

For the side walls of the skin member and the foaming material receiving portion of the core, the arrangements shown in FIGS. 5 and 6 can be used in combination.

The following discussion will be directed to a method for producing a plastic molding (product) as mentioned above.

First, the plastic molding (product) 10 shown in FIGS. 1 and 2 is produced as follows.

With reference to FIG. 7, the core 11 having the foaming material receiving portion 13 and the through holes 17 at the ends of the bottom 15 thereof, and the skin member 27 having the side walls 29 between backward at the opposed ends thereof are disposed in the die assembly 31 having the lower die 33 and the upper die 39.

The skin member 27 is located on the die surface 35 of the lower die 33 with the back surface thereof facing the skin member supporting surface 37 of the die surface 35. The skin member supporting surface 37 is recessed with respect to the remaining portion of the die surface 35 to form stepped portions 38, so that skin member 27 can be correctly positioned on the skin member supporting surface 37.

The core 11 is disposed on the die surface 40 of the upper die 39 with the foaming material receiving portion 13 thereof facing the skin member. The core 11 can be correctly positioned and immovably held on the die surface 40 by holding means such as clips (not shown) or the like attached on the back of the core 11 or on the surface of the upper die 39, that are engaged in the corresponding clip inserting holes (not shown) of the die surface 40 or the core 11. The side walls 29 of the skin member 27 are fitted in the foaming material receiving portion 13 of the core 11 when the die assembly 31 is closed.

Figure 9:
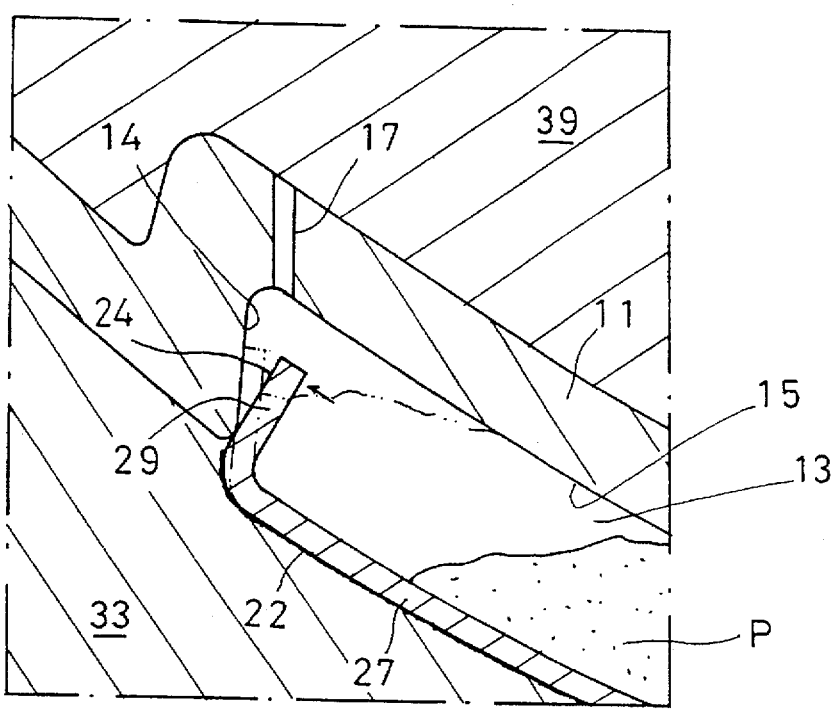
FIG. 9 is an enlarged sectional view of a main part off FIG. 8.

The foaming material P, comprising reactive ingredients such as polyurethane composition is poured in the skin member 27 and thereafter, the upper die 39 and the lower die 33 are closed, as shown in FIG. 9. Consequently, the skin member 27 covers the opening end of the foaming material receiving portion 13 of the core 11. In this state, the side walls 29 of the skin member 27 come into contact with or are slightly spaced from the associated side walls 14 of the foaming material receiving portion 13 off the core 11, owing to the inward inclination or falling of the upper ends of the side walls 29 due to the dead weight thereof, as can be seen in FIG. 9. The through holes 17 of the core 11 are located above the side walls 29 of the skin member 27.

Figure 10:
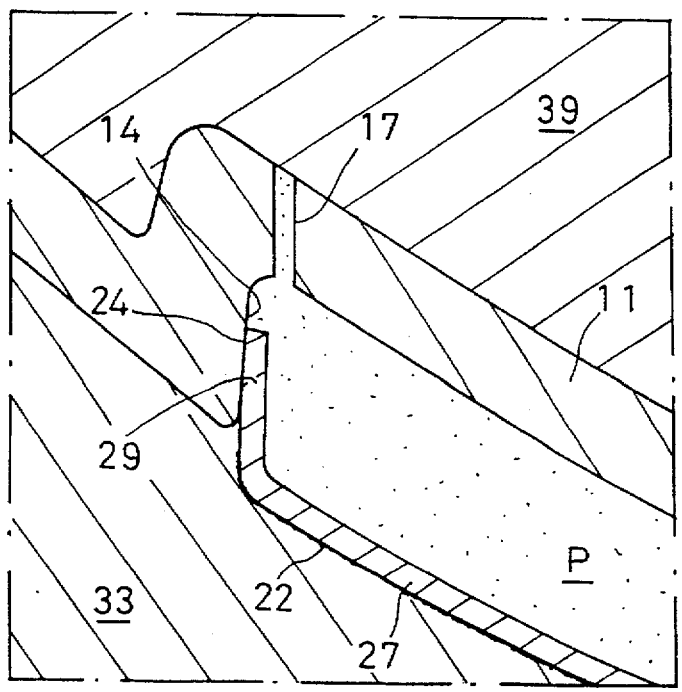
FIG. 10 is an enlarged sectional view of a die assembly in which a foaming material enters a through hole in a closed state.

Thereafter, the foaming material P is foamed, so that the space between the bottom surface 15 of the foaming material receiving portion 13 and the skin member 27 is fitted with the foaming material P thus foamed. During the foaming of the foaming material P, the latter is expanded toward the opposed ends of the bottom surface 15 of the foaming material receiving portion 13 at which the through holes 17 are provided. Consequently, when the expanded foaming material P reaches the side walls 29 of the skin member 27, as indicated at a phantom line in FIG. 9, the side walls 29 are pressed onto the side walls 14 of the core 11 by the expanded foaming material P. Thus, a seal can be established between the side walls 29 of the skin member 27 and the side walls 14 of the core 11, as shown in FIG. 10. If the portions of the side walls 29 that are to come into press contact with the side walls 14 of the core 11 are smooth flat surfaces 24 having no grain pattern, as mentioned above, there is no gap between the side walls 14 and the side walls 29, thus resulting in a closer surface contact therebetween and a sore reliable seal.

Even if the side walls 29 fail to come into close contact with the side walls 14 of the core 11 due to possible uneven or waved side wall surfaces 29 depending on the material or the shape of the skin member 27 or the temperature of the molding die assembly, etc., the side walls 29 of the skin member 27 are pressed against the side wall surfaces 14 of the foaming material receiving portion 13 of the core 11 by the foaming pressure generated and increased by foaming of the expanded foaming material P. Consequently, a reliable seal can be always obtained.

The foaming material P continues expanding along the side walls 29 of the skin member 27 and enters the through holes 17 and reaches the outer surface off the core 11. The number and the size of the through holes 17 are determined in accordance with flow resistance (viscosity) increased by the reaction off the foaming material, etc., so that an appropriate amount of the foaming material P is discharged from the through holes 17 onto the outer surface of the core 11 so as not to produce voids in the foam 23, as mentioned above. When the foaming material P completes its reaction, the same is adhered to the skin member 27 and the core 11 due to the self-adhesiveness thereof thereby to produce an integral plastic molding. The foaming material P in the through holes 17 serves as an engaging portion of the foam with the core.

Thereafter, the die assembly 31 is opened to remove the plastic mold therefrom. Thus, a plastic molding product 10 as shown in FIGS. 1 and 2 is obtained.

The plastic molding 10 thus obtained is light and has no gap between the core 11 and the skin-provided foam 21. Moreover, no foaming material P exists on the outer surface of the outer skin 27, resulting in a good appearance of the product. Furthermore, since the foam 23 is adhered to the core 11, and the foaming material P flows into the through holes 17 to form the engaging portions 25, no separation of the skin-provided foam 21 from the core and no separation of the outer skin 27 from the foam 23 takes place.

Figure 11:
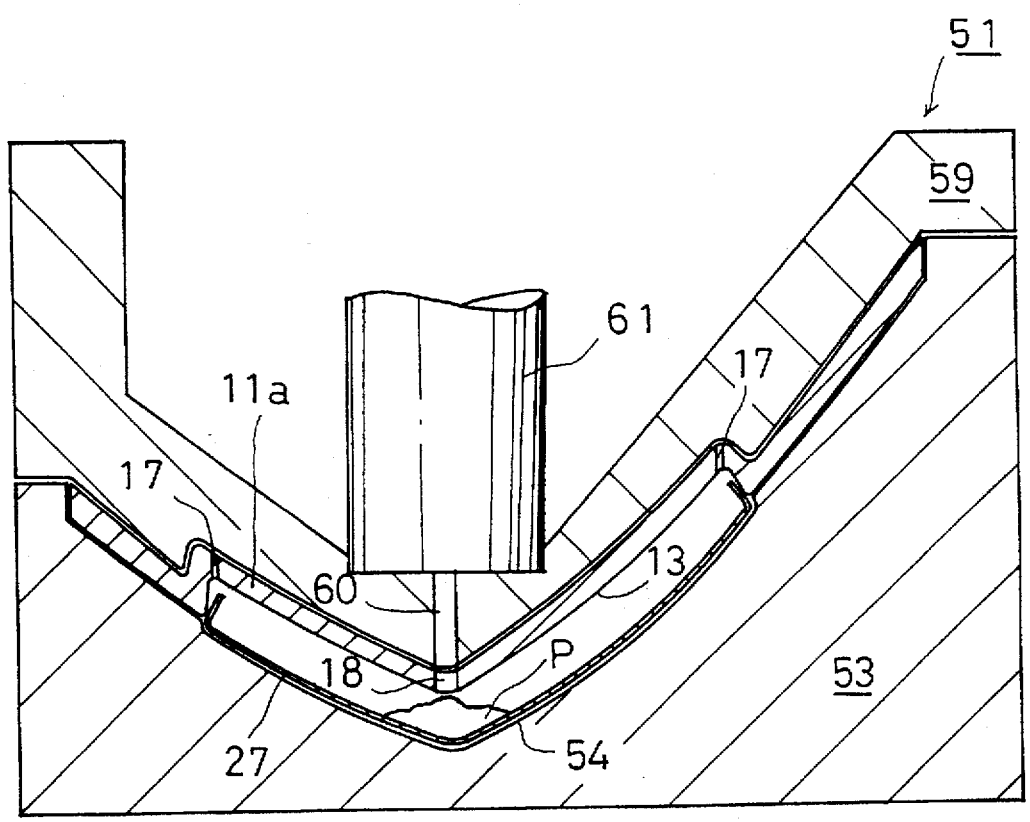
FIG. 11 is a sectional view of a die apparatus for producing a plastic molding (product), according to another aspect of line present invention.

FIG. 11 shows another embodiment of a producing method according to the present invention. The embodiment shown in FIG. 11 is applied to a closed-pouring system in which the foaming material P is poured in the closed die assembly 51. The die surface of the lower die 51 is provided with a recessed skin member supporting surface portion 54, similar to the first embodiment illustrated in FIG. 7. The upper die 59 is provided with a foaming material pouring port 60 in which a pouring nozzle 61 for pouring the foaming material P can be inserted.

In the embodiment illustrated in FIG. 11, the skin member 27 is disposed on the skin member supporting surface portion 54 of the die surface of the lower die 53 and the core 11a is disposed on the die surface of the upper die in the same way of the foregoing embodiment. The core 11a is additionally provided, on the bottom of the foaming material receiving portion 13, with a foaming material pouring hole 18 extending therethrough, in comparison with the core 11 shown in FIG. 7.

Thereafter, the die assembly 51 is closed, and the foaming material P is introduced into the space defined between the bottom surface of the core 11a and the skin member 27 by the pouring nozzle 61 through the foaming material pouring hole 18. Thereafter, the foaming material P is foamed and cured. Finally, the die assembly 51 is opened and the plastic molding thus produced is discharged from the die assembly.

Figure 12:
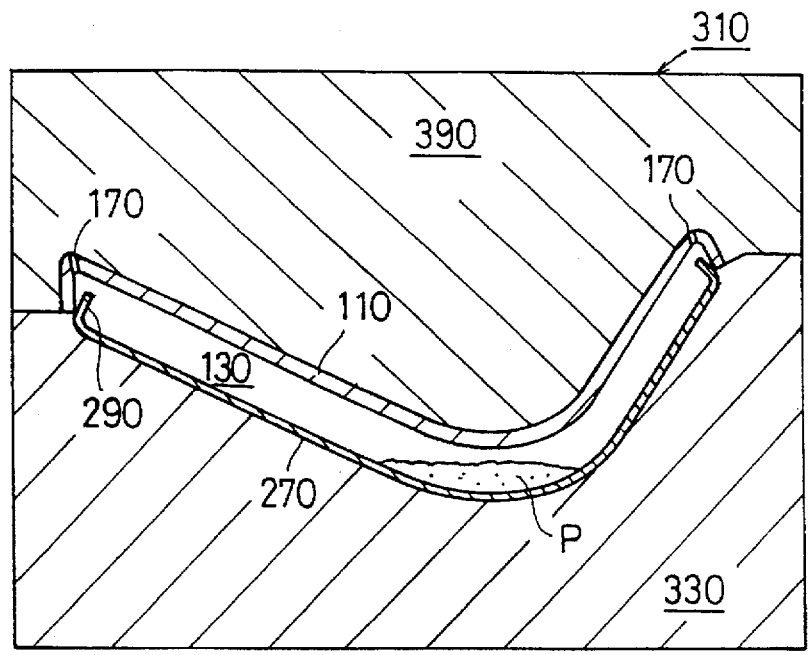
FIG. 12 is a sectional view of a die apparatus for producing a plastic molding (product), according to still another, aspect of the present invention.

FIG. 12 shows a die assembly for producing a plastic molding shown in FIG. 3, i.e., a plastic molding in the skin-provided foam is provided on the entire surface of the core. This embodiment is applied to an open-pouring system in which the foaming material P is poured in the die assembly 310 which is in an open position and thereafter, the die assembly 310 is closed. In FIG. 12, the elements corresponding to those in FIG. 3 are designated with like numerals. Numerals 330 and 390 designate the lower die and the upper die, respectively.

In the embodiment illustrated in FIG. 12, not only can the reliable seal be established between the core and the skin member, but also there is no waste of material of which the skin member is made owing to an absence of a skirt, unlike the prior art. Moreover, no additional operation to cut and remove the skirt is necessary.

The skin member 270 can be formed and finished by a known molding method, such as a vacuum forming or powder-slush molding etc., or is subject to a trimming operation to cut the formed skin member in a predetermined share. The material cut by the trimming can be reused, since the skin member has no foaming material stuck thereto.

Figure 13:
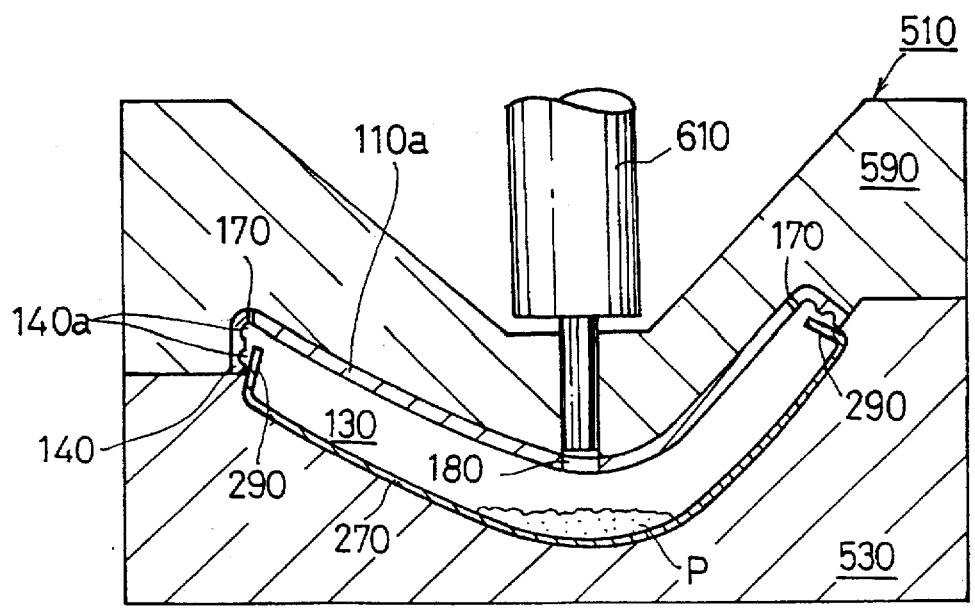
FIG. 13 is a sectional view of a die apparatus for producing a plastic molding (product), according to still another aspect off the present invention.

FIG. 13 shows a die assembly for producing a plastic molding shown in FIG. 4. This embodiment is applied to a closed-pouring system in which the foaming material P is poured in the die assembly 510 which is in a closed position. In FIG. 13, the elements corresponding to those in FIG. 4 are designated with like numerals. Numerals 110a, 530,590 and 610 designate the core which is provided with he foaming material pouring hole 180, the lower die, the upper die, and he pouring nozzle, respectively.

In the embodiment illustrated in FIG. 13, the recessed grooves 140a provided on the side walls 140 of the foaming material receiving portion 130 of the core are adapted to receive the foaming material penetrating between the side walls 290 of the skin member 270 and the side walls 140 of the core during foaming as mentioned above, thereby to reduce the internal pressure of the foaming material P in the space in the cavity. As a result, the side walls 290 of the skin member are pressed onto the side walls 140 of the core to establish a reliable seal therebetween. Moreover, there is no flash in the plastic molding thus produced.

It is possible to provide the recessed grooves 140a on the core shown in FIGS. 7 through 11 to ensure a more reliable seal.

Figure 14:
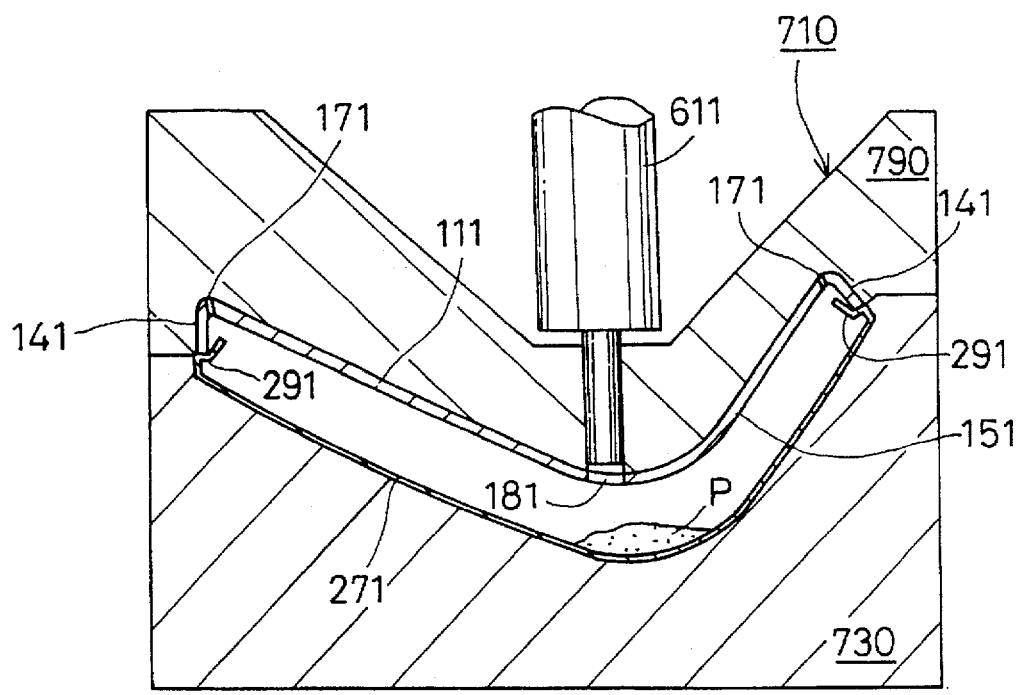
FIG. 14 is a sectional view of a die assembly for producing a plastic molding (product) shown in FIG. 5.
Figure 15:
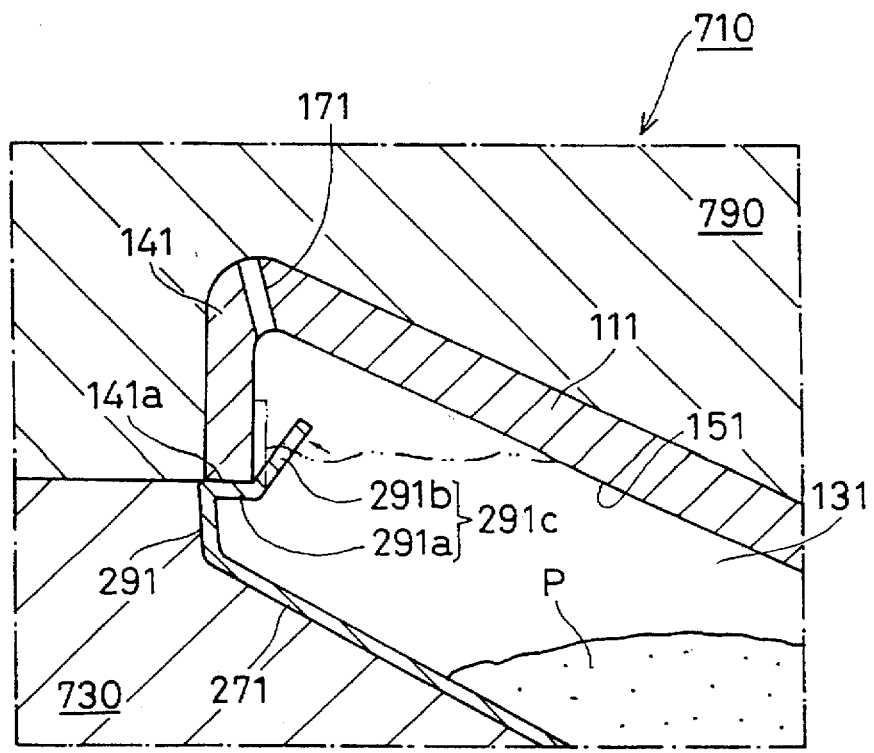
FIG. 15 is an enlarged sectional view of a main part of FIG. 14 during foaming.

FIG. 14 shows a die assembly for producing a plastic molding shown in FIG. 5. FIG. 15 shows an enlarged sectional view of a main part of the die assembly shown in FIG. 14 during foaming. In FIGS. 14 and 15, the elements corresponding to those in FIG. 5 are designated with like numerals. Numerals 181, 611, 710, 730 and 790 designate the foaming material pouring hole 180 provided in the core 111, the pouring nozzle, the die assembly, the lower die, and the upper die, respectively.

In the embodiment illustrated in FIGS. 14 and 15, the generally L-shaped bent portions 291c including the sealing flat surface portions 291a extending toward the inside of the skin member and the sealing tongues 291b extending toward the bottom surface 151 of the foaming material receiving portion are provided on the side walls 291 of the skin member 271, as mentioned above. The core 111 and the skin member 271 are disposed in the die assembly 710 so that the flat surface portions 291a are brought into surface contact with the front ends 141a of the side walls 141. If the skin member 271 is formed by, for example, the vacuum forming process, the skin member is thin particularly at the end portions therof, so that the sealing tongues 291b of the skin member tend to fall or be inclined toward the inside of the skin member, as shown in FIGS. 14 and 15.

However, if the inclination or falling of the sealing tongues 291b occurs, the seal can be ensured between the core and the skin member, since the front ends 141a of the side walls 141 come into close contact wit the sealing flat surface portions 291a.

Thereafter, the foaming material P is poured and foamed from the nozzle 611 into a space between the bottom surface 151 of the foaming material receiving portion of the core and the skin member 271. The sealing tongues 291b of the side walls of the skin member are pressed onto the inner surfaces of the corresponding side walls 141 to establish a fluid-tight seal therebetween. Therefore, in this embodiment, the side walls 291 of the skin member 271 can be certainly sealed by both the sealing flat surface portions 291a and the sealing tongues 291b. Even if no close contact occurs between the sealing tongues 291b and the side walls 141 of the core, due to an inclination or falling of the sealing tongues 291b, the seal can be provided by the close contact of the flat surface portions 291a with the front ends 141a of the side walls 141.

Figure 16:
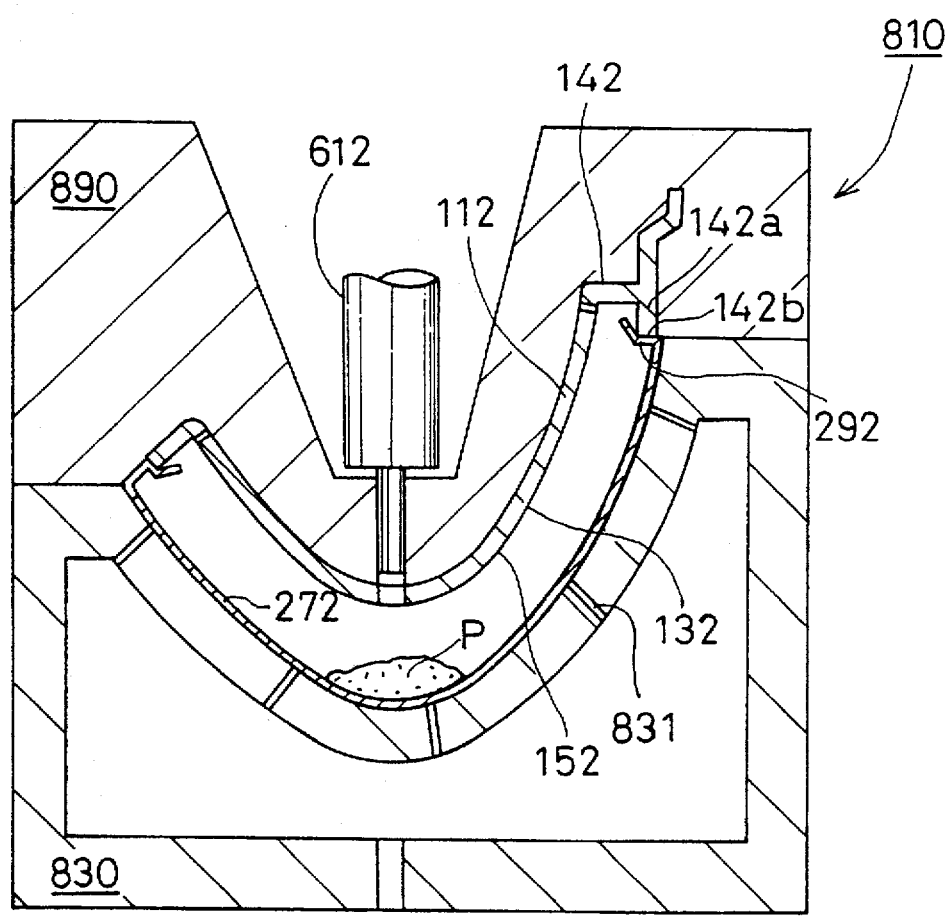
FIG. 16 is a sectional view of a die assembly for producing a plastic molding (product) shown in FIG. 6.
Figure 17:
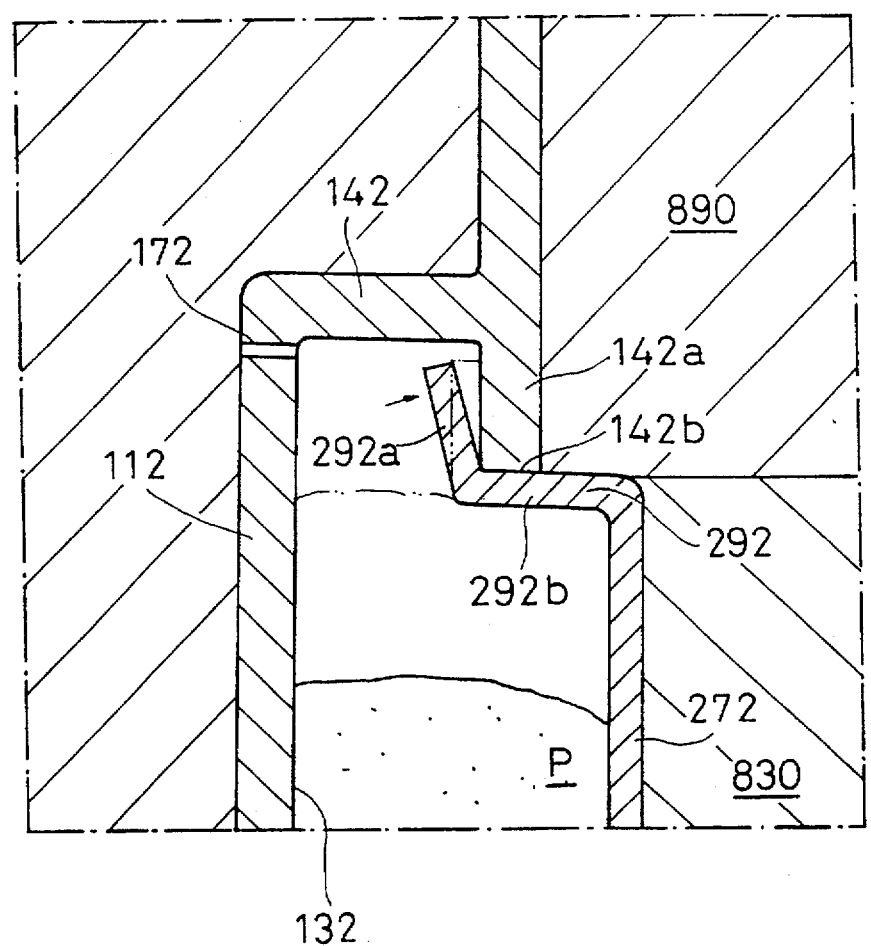
FIG. 17 is an enlarged sectional view of a main part of FIG. 16 during foaming.
Figure 18:
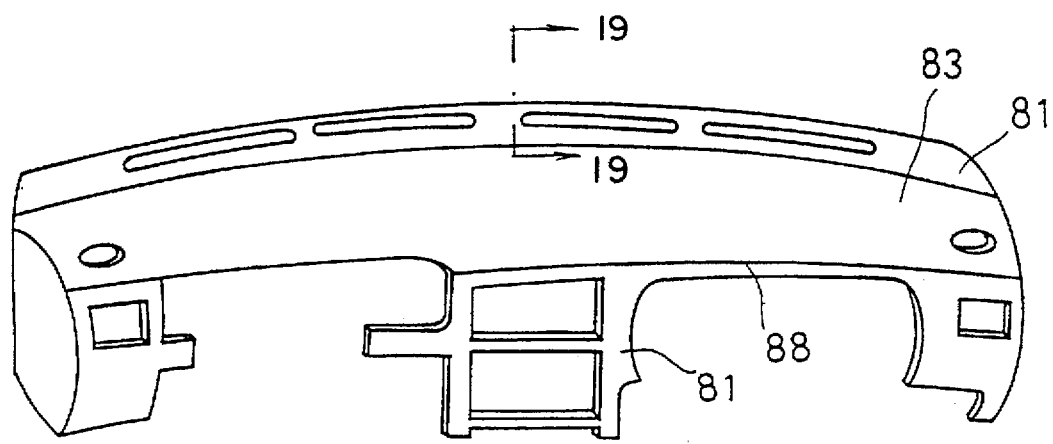
FIG. 18 is a perspective view of a known plastic molding (product)
Figure 19:
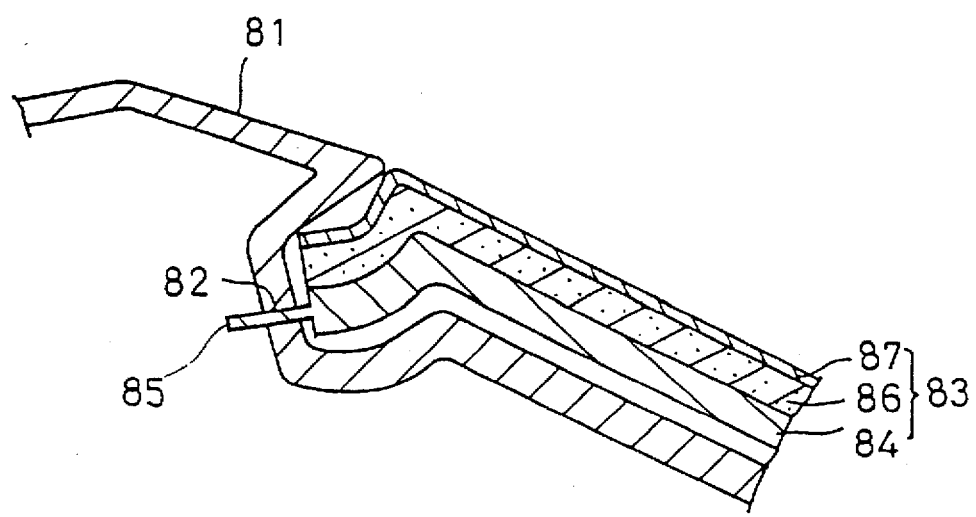
FIG. 19 is a sectional view taken along the line A—A in FIG. 18.

FIG. 16 shows a die assembly for producing a plastic molding shown in FIG. 6. FIG. 17 shows an enlarged sectional view of a main part of the die assembly shown in FIG. 16 during foaming. In FIGS. 16 and 17, the elements corresponding to those in FIG. 6 are designated with like numerals. Numerals 612, 810, 830, and 890 designate the foaming material pouring nozzle, the die assembly, the lower die, and the upper die, respectively. The lower die 830 is provided with vacuum sucking holes 831 which are connected to a vacuum pump (not shown) to suck the skin member 272 located on the die surface of the lower die 830.

In this embodiment, the outwardly projecting flanges 292a are provided on the side walls 292 of the skin member 272, and the inwardly projecting flanges 142a are provided on the side walls 142 of the core 112, respectively. The core 112 and the skin member 272 are disposed within the die assembly 810 as mentioned above, so that the front ends 142b of the flanges 142a abut against the surfaces of the side walls 292b of the skin member 272. In this state, if the skin member 272 is thin, the flanges 292a tend to be inclined toward the inside of the skin member as shown in FIGS. 16 and 17. However, since the front ends 142b of the flanges 142a come into surface contact with the side surfaces of the side walls 292b, a seal can be reliably established between the core and the skin member.

Thereafter, the foaming material P is poured and foamed from the nozzle 612 into a space between the bottom surface 152 of the foaming material receiving portion of the core and the skin member 272. The outwardly extending flanges 292a are pressed outwardly to come into close contact with the inner surfaces of the side walls 142 thereby to seal the same. Consequently, in this embodiment, the side walls 292 are certainly sealed at two portions. Even if the outwardly projecting flanges 292a are inclined or fall so that there are gaps between the flanges 292a and the side walls 142, the seal is established between the ends 142b of the inwardly projecting flanges 142a and the outer surfaces of the side walls 292b. Therefore, no leakage of the foaming material P occurs.

As can be understood from the above discussion, according to the present invention, a light plastic molding having no or little gap between the core and the skin-provided foam can be obtained. Moreover, there is no leakage of the foaming material to be applied to the outer surface of the plastic molding thus obtained, thus resulting in an improved aesthetic appearance of the product. Furthermore, no separation of the skin-provided foam from the core and the skin member from the foam takes place. There is no waste of material of which the skin member is made.

In addition to the foregoing, since the foam is adhered to the skin member and the core at the same time as the foaming of the foaming material, no subsequent operation to mount the skin-provided foam to the core is necessary. Consequently, the manufacturing operation of the plastic molding can be simplified and made inexpensive.

I claim:

1. A method of producing a molding, comprising the steps of:

disposing a skin member on a die surface of a first die, said skin member having an inner surface and an outer surface, ends of said skin member bending inwardly, away from said outer surface of said skin member, said outer surface of said skin member contacting said die surface of said first die;

disposing a core about said skin member, end portions of said core having an interior side wall contacting said ends of said skin member at the outer surface of said skin member, said core and said skin member thereby defining a foaming material receiving portion, said core having an inner surface and an outer surface, said foaming material receiving portion being bounded by an inner surface of said skin and said inner surface of said core;

pouring and foaming a foaming material into said foaming material receiving portion; and leaking said foaming material from said foaming material receiving portion to an exterior of said foaming material receiving portion through through-holes in said core so as not to produce voids in the foam, forming an engaging portion between the foam and the core.

2. A producing method according to claim 1, wherein said core is disposed on a die surface of a second die.

3. A producing method according to claim 1, wherein said die surface of said first die is provided with a recessed skin member supporting surface defined by stepped portions, and the method further comprises disposing the skin member on the recessed skin member supporting surface.

4. A producing method according to claim 1, where all portions of the skin member that come into contact with the interior side walls of the core are made of smooth flat surfaces.

5. A producing method according to claim 1, wherein said skin member is provided, on the side portions thereof, with generally L-shaped bent ends in cross section, each generally L-shaped bent end including a sealing flat surface portion extending toward the foaming material receiving portion and a sealing tongue extending from the associated sealing flat surface portion away from said outer surface of said skin member, so that when the core and the skin member are disposed in the die assembly, the sealing flat surface portions abut against and are substantially parallel to the corresponding interior side walls of the core.

6. The method of claim 5, wherein said generally L-shaped bent ends have an angle less than 180 degrees on said outer surface of said skin member.

7. A producing method according to claim 1, wherein said ends of said skin member include outwardly projecting flanges, projecting away from said foaming material receiving portion and wherein said core is provided on said interior side walls with inwardly projecting flanges, and the method further comprises abutting the inwardly projecting flanges of said core against the outer surface of said skin member at said ends of said skin member when the core and the skin member are disposed in the die assembly.

8. The method of claim 7, wherein said outwardly projecting flanges extend from portions of said ends of said skin members which extend away from said outer surface of said skin member to thereby form an angle less than 180 degrees on said outer surface of said skin member.

* * * * *